United States Patent [19]

Peled et al.

[11] 4,318,969

[45] Mar. 9, 1982

[54] ELECTROCHEMICAL CELL

[75] Inventors: Emanuel Peled, Even Yehuda, Israel; Anthony Lombardi, Winchester, Mass.

[73] Assignee: GTE Laboratories Incorporated, Waltham, Mass.

[21] Appl. No.: 208,977

[22] Filed: Nov. 21, 1980

[51] Int. Cl.³ .............................................. H01M 4/36
[52] U.S. Cl. ................................ 429/105; 429/194; 429/196
[58] Field of Search ................... 429/196, 194, 105

[56] References Cited

U.S. PATENT DOCUMENTS

| | | | |
|---|---|---|---|
| 4,093,784 | 6/1978 | Driscoll | 429/101 |
| 4,224,389 | 9/1980 | Peled | 429/194 |
| 4,278,741 | 7/1981 | Kalnoki-kis | 429/196 X |
| 4,283,469 | 8/1981 | Goebel et al. | 429/196 |

*Primary Examiner*—Charles F. LeFevour
*Attorney, Agent, or Firm*—David M. Keay

[57] ABSTRACT

An electrochemical cell having an anode which is an alloy of an oxidizable metal, specifically lithium, and an element having a lower oxidation potential, for example calcium. The cell is partially discharged to deplete the amount of lithium at the surface of the anode. Then the cell is conditioned, preferably by annealing at a temperature of about 70° C. for one to two weeks. This treatment produces an anode having a surface region which is either a layer consisting mostly of the element or a lithium compound of the element. This protective coating on the anode limits the short circuit current which can flow through the cell.

13 Claims, 1 Drawing Figure

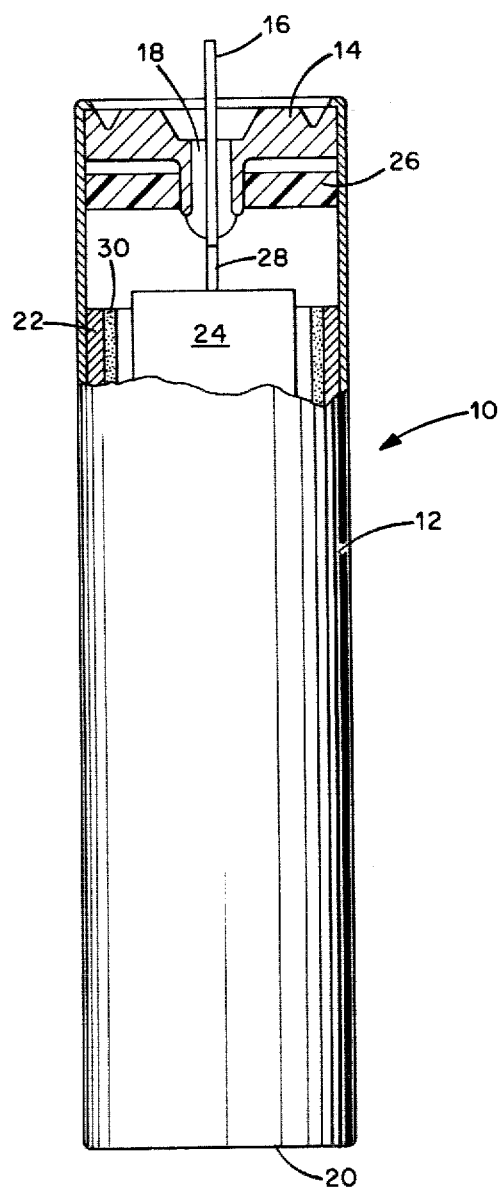

ELECTROCHEMICAL CELL

BACKGROUND OF THE INVENTION

This invention relates to electrochemical cells. More particularly, it is concerned with high power primary electrochemical cells having an oxidizable anode, specifically lithium, and to methods of manufacturing such cells.

Electrochemical cells which employ soluble or liquid cathode materials have undergone rapid development in recent years. In these cells the active cathode material is a fluid solvent and the active anode material is a highly electropositive metal, such as lithium. An electrolyte solute is dissolved in the solvent cathode material to provide electrical conductivity.

One particular type of electrochemical cell of the foregoing class contains an anode of lithium and a reducible liquid cathode of thionyl chloride. Typically the electrolyte solute dissolved in the solvent in lithium tetrachloroaluminate. These electrochemical cells have proven to have outstanding weight and volume energy density. The lithium anode and the cathode current collector are relatively thin, less than 1 and 2 mm, respectively. Thus, these cells have a high electrode surface to volume ratio and, therefore, very high power capability.

When such a cell becomes short circuited, either internally or externally, very high short circuit currents flow through the cell. These currents cause heating of the components within the cell which may be sufficient to cause melting of some of the materials. Lithium melts at about 180° C. Molten lithium may react with the thionyl chloride or with the discharge products produced within the cell in a violent chemical reaction with possible undesirable consequences.

SUMMARY OF THE INVENTION

An electrochemical cell manufactured in accordance with the present invention provides a greater tolerance to short circuit conditions by limiting the current which flows and the possible consequent destructive chemical reactions which may occur. In accordance with the method of the invention an electrochemical cell assembly is provided which has an anode electrode including a mixture of an oxidizable metal and an element having an oxidation potential less than the oxidizable metal. The amount of the oxidizable metal at the surface portion of the anode electrode is depleted by partially discharging the electrochemical cell assembly. Then the surface portion is formed to a protective coating by conditioning the electrochemical cell assembly at a temperature and for a period of time to convert the remainder of the oxidizable metal and element in the surface portion to an intermetallic phase of the oxidizable metal and the element.

The completed electrochemical cell in accordance with the present invention includes an oxidizable anode electrode having a bulk region which includes a mixture of the oxidizable metal and the element. A protective coating surrounding the bulk region includes an intermetallic phase of the oxidizable metal and element and contains less of the oxidizable metal than does the bulk region. The cell also includes a reducible cathode material and a liquid electrolyte in contact with the anode electrode and the cathode material.

In manufacturing an electrochemical cell in accordance with the present invention the assembly is discharged at a low enough current density or low enough anodic over-potential such that only the most electropositive material, the oxidizable metal, for example lithium, will be oxidized. The amount of lithium at the surface of the anode is depleted leaving the surface enriched with the element. The partially discharged electrochemical cell assembly may be conditioned by storing for a period in excess of two weeks at room temperature. Preferably, however, the electrochemical cell assembly is conditioned by annealing at a temperature of the order of 70° C. for a period of one to two weeks. The complete treatment of discharging the electrochemical cell assembly and then conditioning produces an intermetallic phase of the oxidable metal and element at the surface which is either a layer consisting mostly of the element or a lithium compound of the element. In any event, the resulting coating is a protective layer which limits the short circuit current which can flow.

BRIEF DESCRIPTION OF THE DRAWING

The single FIGURE of the drawing is a representation partially in cross-section illustrating one embodiment of an electrochemical cell in accordance with the present invention.

For a better understanding of the present invention together with other and further objects, advantages, and capabilities thereof, reference is made to the following discussion and appended claims in connection with the above-described drawing.

DETAILED DESCRIPTION OF THE INVENTION

The single FIGURE of the drawing illustrates a primary electrochemical cell 10 in accordance with the present invention. The cell 10 is formed of an outer case 12 of conductive material which is sealed by a welded cover 14. Located centrally of the cover is the cathode terminal 16, which is the positive external terminal. The cathode terminal is insulated from the outer case by a sealing ring 18 of insulating material. The anode terminal, which is the negative external terminal of the cell, is provided by the outer case 12, more particularly, the bottom surface 20. A plastic washer 26 fits snugly within the case 12 and its central opening receives the central portion of the cover 14 through which the central terminal lead 16 extends.

The electrodes of the cell are located within the interior of the outer case 12. The anode 22 of construction to be described in detail hereinbelow is disposed in close mechanical and electrical contact with the interior of the outer case 12. A cathode current collector 24 having active external layers of carbon is located centrally of the outer case 12 and has a contact 28 connected to the center terminal 16. The electrodes are separated from each other by an intervening porous separator 30 of insulating material. The dimensions and the relative placement of the electrodes are such that all portions of the effective surface of the anode 24, the inward facing surface, is directly opposite and facing the surface of the cathode current collector 24.

The anode material is an alloy of an active oxidizable metal and an element. Preferably, as is well-known in the art, the anode contains lithium as the active material. Other oxidizable metals which may be employed as the active material in electrochemical cells of this type are other alkali metals. In accordance with the present invention, the element is less electropositive than lithium thus having a lower oxidation potential than the active material. Materials which may be employed as the element in cooperation with lithium are calcium, magnesium, tin, silicon, cadmium, zinc, aluminum, lead, boron, bismuth, strontium, and barium. One or more of these elements is included with the lithium in an amount of between 1 and 20 atomic percent.

The cell contains an electrolytic solution which includes a solvent of a reducible liquid cathode material. Among the cathode materials found useful are fluid oxyhalides, fluid non-metallic oxides, fluid non-metallic halides, and mixtures thereof. Oxyhalides of sulfur and phosphorous have been found particularly useful, and for various practical reasons thionyl chloride is very widely used.

Electrolyte solutes are added to the solvent in order to raise the conductivity of the solution, since the cathode solvent materials typically are of low conductivity. The solute provides at least one anion having the formula $MX_4^-$, $M'X_6^-$, and $M''X_6^-$, where M is an element selected from the group consisting of aluminum and boron; M' is an element selected from the group consisting of phosphorous, arsenic, and antimony; M'' is an element selected from the group consisting of tin, zirconium, and titanium; and X is a halogen. The solute also provides at least one cation selected from the group consisting of alkali metals, the alkaline earth metals, the lanthanides, $POCl_2^+$, $SOCl^+$, and $SO_2Cl^+$. The solute most frequently employed with lithium anodes and a cathode of thionyl chloride is lithium tetrachloroaluminate.

The electrochemical cell assembly as described is treated by a preliminary discharge at a low current density to remove up to 25% of its total capacity. During this treatment the primary material, lithium, of the anode is depleted by the oxidizing action taking place at the surface of the anode electrode. The discharge current density is maintained below the level which would cause the cell potential to drop below the oxidation potential of the element. Thus, none of the element is removed and the surface of the anode electrode becomes enriched with the element.

Subsequent to the discharge procedure, the assembly is conditioned by storing at room temperature for a long period of time and preferably by annealing at a temperature of the order of 70° C. for a period of one week for up to two weeks. This treatment produces a surface layer of the anode which is either largely of the element or of a compound of lithium and the element. In either event the intermetallic phase formed is such that the active lithium remains spaced from the electrolyte sufficiently to greatly limit the maximum current which can flow as during the extreme conditions of a short circuit.

The following are examples of electrochemical cells of prior art construction and of cells manufactured in accordance with the present invention which were subjected to short circuit conditions.

EXAMPLE I

An electrochemical cell of prior art type in standard AA size configuration was constructed with an anode of pure lithium pressed against the inside surface of the case. A non-woven glass separator 0.2 mm thick was placed between the anode and the cathode current collector. The electrolytic solution was 1.8 molar lithium tetrachloroaluminate in thionyl chloride. The cell was short circuited between the terminals and the short circuit current was 2 to 2.5 amperes. The maximum external temperature of the case was 100° C.

EXAMPLES II-VI

AA size cells in accordance with the present invention as illustrated in the FIGURE were constructed employing anodes of lithium alloyed with different elements. The specific anode materials, details of the discharge and conditioning treatments, and the results obtained on short circuit are summarized in Table I.

TABLE I

| Example | Anode | Discharge | Conditioning | Short-Circuit Current |
|---|---|---|---|---|
| II | Li-6 a/o Al | 3.6 mAh/cm$^2$ (on 100 Ω) | 14 days at 72° C. | .3A at t = 0 .47A (max) at t = 1000s |
| III | Li-6 a/o Al | 3.6 mAh/cm$^2$ (on 100 Ω) | 14 days at 72° C. + 6 days at room temperature | .21A at t = 0 .31A (max) at t = 1200s |
| IV | Li-5 a/o Ca | 2.4 mAh/cm$^2$ (on 100 Ω) | 14 days at 72° C. | 50 mA at t = 0 1.4A (max) at t = 1500s |
| V | Li-4 a/o Si | 4.8 mAh/cm$^2$ (on 100 Ω) | 14 days at 72° C. | 70 mA at t = 0 115 mA (max) at t = 5h 55 mA at t = 5h after 6 days of rest open circuited 250 mA at t = 0 150 mA at t = 100s 60 mA at t = 200s 40 mA at t = 7h |
| VI | Li-4 a/o Si | 4.8 mAh/cm$^2$ (on 100 Ω) | 14 days at 72° C. + 6 days at room temperature | 120 mA at t = 0 190 mA (max) at t = 400s 55 mA at t = 4h |

It can be seen that short circuit current was reduced markedly in comparison with the 2 to 2.5 ampere short circuit current for the prior art AA cells of Example I. After five or more hours of continuous short circuit operation, the protective coating on the anode was not disrupted and the short circuit current decreased to 55 mA or in some cases to 40 mA. The cells provided good capacity after treatment.

EXAMPLE VII

An AA cell of construction similar to those in Examples II through VI was constructed using anode of lithium alloyed with 3 atomic percent magnesium and 5 atomic percent calcium. The electrochemical cell assembly was discharged for 5.2 mAh/cm² of anode surface and then annealed at a temperature of 70° C. for 6 days. Upon short circuit the cell produced a peak current of 350 mA at 900 seconds.

EXAMPLE VIII

Another AA cell was constructed with an anode of lithium containing 5 atomic percent zinc. The cell was discharged for 6.3 mAh/cm² and then annealed at a temperature of 70° C. for 6 days. Upon short circuiting the cell produced a constant short circuit current of about 40 mA for a 5 hour period.

EXAMPLE IX

Another AA cell was constructed with an anode of lithium containing 10 atomic percent calcium. The cell was discharged for 4.4 mAh/cm² and then annealed at 70° C. for 6 days. After one hour under short circuit a peak short circuit current of 165 mA was reached.

EXAMPLE X-XIII

AA cells similar to those previously described were constructed employing an anode of an alloy of lithium and 5 atomic percent calcium. The particular discharge and conditioning treatments together with the results upon short circuiting are summarized in Table II.

TABLE II

| Example | Discharge | Conditioning | Short-Circuit Current |
|---|---|---|---|
| X | 4.8 mAh/cm² | 4 days at room temperature | .3A at t = 0<br>.36A at t = 2000s<br>.3A at t = 3000s |
| XI | 4.8 mAh/cm² | 3 days at room temperature + 2 days at 70° C. | 10 mA at t = 0<br>50 mA (max) at t = 8h |
| XII | 4.8 mAh/cm² | 4 days at room temperature | 70 mA at t = 0<br>150 mA (max) at t = 2h |
| XIII | 4.8 mAh/cm² | 4 days at room temperature + 2 days at 70° C. | 10 mA at t = 0<br>60–80 mA (max) at t = 8h |

EXAMPLE XIV

An electrochemical cell of prior art type in standard D size configuration was constructed with an active electrode area of about 220 cm². The anode was of pure lithium and was 0.6 mm thick. The carbon cathode current collector was 1 mm thick and the insulating separator was 0.18 mm thick. The electrodes and separator were spirally wound in a cylindrical configuration. The electrolytic solution was 1.8 molar lithium tetrachloroaluminate in thionyl chloride. The cell was short circuited between the terminals, and the short circuit current reached a peak of about 30 amperes. Within about 3 minutes of short circuiting, a chemical reaction took place within the cell destroying the cell.

EXAMPLE XV

A D size cell in accordance with the present invention was constructed employing an anode of lithium containing 5 atomic percent calcium. The dimensions of the anode were 12 inches by 1½ inches by 0.020 inch thick. The dimensions of the cathode current collector were 15 inches by 1⅞ inches by 0.033 inch thick. Insulating glass fiber separators 0.13 mm thick were placed between the anode and cathode current collector. The electrodes and separators were spirally wound in a cylindrical configuration such that both sides of the anode faced the cathode current collector. The electrolytic solution was 1 molar lithium tetrachloroaluminate in thionyl chloride. The cell assembly was treated by discharging for 12 mAh/cm² at a current density of 2 mA/cm². The assembly was then annealed at a temperature of 70° C. for 10 days. The cell was short circuited externally. Internal pressure within the cell caused the cell to bulge and to cease functioning. There was no rapid chemical reaction of the lithium with other materials within the cell.

EXAMPLE XVI

A D size cell having the same construction as that of Example XV employing an anode of lithium with 3 atomic percent magnesium was constructed. The cell was discharged for 11 mAh/cm² at a current density of 0.5 mA/cm² and then annealed at a temperature of 70° C. for 12 days. The cell was shorted externally. The peak short circuit current was 16 amperes. After 22 minutes of continuous short circuit operation, the cover of the cell ruptured. The temperature of the case at this time was 197° C. The rupture was due to internal pressures within the case.

EXAMPLE XVII

A D size cell of the same configuration as previously described was constructed with an anode of lithium containing 5 atomic percent zinc. The cell was treated by discharging for 11 mAh/cm² at a current density of 0.5 mA/cm². The cell was then annealed at a temperature of 70° C. for 12 days. The cell was shorted externally. The peak short circuit current was 9.6 amperes. After an hour of continuous shorting, the cell ruptured at the cover. At this point the temperature of the can was 184° C. which is above the melting point of the lithium-zinc alloy, which is 161° C.

Thus, it can be seen that in accordance with the present invention the anode electrode is provided with a protective coating which limits the current which flows under short circuit conditions.

While it has been shown and described what are considered preferred embodiments of the present invention, it will be obvious to those skilled in the art that various changes and modifications may be made therein without departing from the invention as defined by the appended claims.

What is claimed is:

1. A nonaqueous electrochemical cell comprising
   an oxidizable anode electrode comprising
   a bulk region including a mixture of an oxidizable metal and an element having an oxidation potential less than said oxidable metal, and
   a protective coating, surrounding the bulk region, including an intermetallic phase of said oxidizable metal and said element and containing less of said oxidizable metal than said bulk region;

a reducible liquid cathode material; and a liquid electrolyte in contact with the anode electrode and cathode material.

2. An electrochemical cell in accordance with claim 1 wherein
said oxidizable metal is selected from the group consisting of alkali metals.

3. An electrochemical cell in accordance with claim 2 wherein
said element is present in the bulk region in an amount between 1 and 20 atomic percent of the mixture.

4. An electrochemical cell in accordance with claim 3 wherein
said oxidizable metal is lithium; and
said element is selected from the group consisting of calcium, magnesium, tin, silicon, cadmium, zinc, aluminum, lead, boron, bismuth, strontium, and barium.

5. A non-aqueous electrochemical cell comprising
an oxidizable anode electrode comprising
a bulk region including a mixture of an oxidizable metal and an element having an oxidation potential less than said oxidizable metal, and
a protective coating, surrounding the bulk region, formed by depleting the amount of said oxidizable metal in a portion of the bulk region and converting the remainder of the oxidizable metal and element in said portion to an intermetallic phase of said oxidizable metal and said element;
a reducible liquid cathode material; and
a liquid electrolyte in contact with the anode electrode and cathode material.

6. An electrochemical cell in accordance with claim 5 wherein
said oxidizable metal is selected from the group consisting of alkali metals.

7. An electrochemical cell in accordance with claim 6 wherein
said element is present in the bulk region in an amount between 1 and 20 atomic percent of the mixture.

8. An electrochemical cell in accordance with claim 7 wherein
said oxidizable metal is lithium; and
said element is selected from the group consisting of calcium, magnesium, tin, silicon, cadmium, zinc, aluminum, lead, boron, bismuth, strontium, and barium.

9. A nonaqueous electrochemical cell comprising
an oxidizable anode electrode comprising
a bulk region including a mixture of an oxidizable metal and an element having an oxidation potential less than said oxidizable metal, and
a protective coating, surrounding the bulk region, including an intermetallic phase of said oxidizable metal and said element and containing less of said oxidizable metal than said bulk region;
a cathode current collector; and
an electrolytic solution, in contact with the anode electrode and the cathode current collector, comprising a reducible liquid cathode material and an electrolyte solute dissolved therein.

10. An electrochemical cell in accordance with claim 9 wherein
said oxidizable metal is lithium; and
said element is present in the bulk region in an amount between 1 and 20 atomic percent of the mixture.

11. An electrochemical cell in accordance with claim 10 wherein
said element is selected from the group consisting of calcium, magnesium, tin, silicon, cadmium, zinc, aluminum, lead, boron, bismuth, strontium, and barium.

12. An electrochemical cell in accordance with claim 11 wherein
the reducible liquid cathode material is selected from the group consisting of fluid oxyhalides, fluid non-metallic oxides, fluid non-metallic halides, and mixtures thereof.

13. An electrochemical cell in accordance with claim 12 wherein
said reducible liquid cathode material is thionyl chloride; and
said electrolyte solute is lithium tetrachloroaluminate.

* * * * *